(12) United States Patent
Sorbara et al.

(10) Patent No.: US 8,917,747 B2
(45) Date of Patent: Dec. 23, 2014

(54) METHOD AND APPARATUS FOR DSL BACK-CHANNEL COMMUNICATION

(75) Inventors: Massimo Sorbara, Freehold, NJ (US); William J. Santulli, Tinton Falls, NJ (US); Clark B. Woodworth, Rumson, NJ (US); Kachung Wong, Holmdel, NJ (US); Kevin D. Fisher, Palo Alto, CA (US)

(73) Assignee: Ikanos Communications, Inc., Fremont, CA (US)

( * ) Notice: Subject to any disclaimer, the term of this patent is extended or adjusted under 35 U.S.C. 154(b) by 170 days.

(21) Appl. No.: 13/493,914

(22) Filed: Jun. 11, 2012

(65) Prior Publication Data

US 2013/0148796 A1 Jun. 13, 2013

Related U.S. Application Data

(60) Provisional application No. 61/495,985, filed on Jun. 11, 2011.

(51) Int. Cl.
*H04J 3/24* (2006.01)
*H04M 11/06* (2006.01)
*H04M 3/00* (2006.01)

(52) U.S. Cl.
CPC ............ *H04M 3/002* (2013.01); *H04M 11/062* (2013.01)
USPC .......................................... 370/474; 370/389

(58) Field of Classification Search
USPC .................. 370/229–235, 389, 474
See application file for complete search history.

(56) References Cited

U.S. PATENT DOCUMENTS

| 7,031,301 | B1* | 4/2006 | Oz et al. ................. 370/352 |
| 7,639,596 | B2* | 12/2009 | Cioffi ..................... 370/201 |
| 7,834,949 | B2 | 11/2010 | Tasaka et al. |
| 7,925,935 | B2 | 4/2011 | Sorbara et al. |
| 8,413,000 | B2* | 4/2013 | Sorbara et al. ........... 714/748 |
| 8,553,721 | B2* | 10/2013 | Heise ..................... 370/474 |
| 2008/0049855 | A1 | 2/2008 | Duvaut et al. |
| 2008/0263413 | A1 | 10/2008 | Sorbara et al. |
| 2009/0003296 | A1 | 1/2009 | Zheng |
| 2009/0245081 | A1 | 10/2009 | Ashikhmin et al. |
| 2009/0245340 | A1 | 10/2009 | Sorbara et al. |
| 2009/0271550 | A1 | 10/2009 | Clausen et al. |
| 2009/0310502 | A1 | 12/2009 | Nuzman et al. |

(Continued)

OTHER PUBLICATIONS

International Search Report and Written Opinion for PCT/US2012/0419717 Issued Jun. 21, 2013.

(Continued)

*Primary Examiner* — Phuc Tran
(74) *Attorney, Agent, or Firm* — Pillsbury Winthrop Shaw Pittman LLP (57) ABSTRACT

DSL backchannel data and/or information is transported upstream in a vectored, bonded line DSL system. Backchannel data (e.g., error samples or the like from downstream-end DSL equipment) is encapsulated/packetized using Layer 2 encapsulation. Upstream user data is packetized into Ethernet packets or the like. The backchannel data and upstream user data are combined and the combined data transmitted to an upstream-end DSL apparatus, such as an access node. The combined data are separated in the upstream-end DSL apparatus so that the upstream user data can be processed further. The Layer 2 encapsulated backchannel data is decapsulated and then routed to a vectoring control entity or the like for use in operating the DSL system, for example in mitigating FEXT crosstalk in the DSL system's operation.

13 Claims, 6 Drawing Sheets

(56) References Cited

U.S. PATENT DOCUMENTS

| | | |
|---|---|---|
| 2010/0046684 A1 | 2/2010 | De Lind Van Wijngaarden et al. |
| 2010/0088569 A1* | 4/2010 | Sorbara et al. ............... 714/751 |
| 2010/0138714 A1* | 6/2010 | Sorbara et al. ............... 714/748 |
| 2010/0191968 A1* | 7/2010 | Patil et al. .................... 713/170 |
| 2010/0195478 A1 | 8/2010 | Schenk et al. |
| 2010/0260259 A1* | 10/2010 | Kimmich et al. ........ 375/240.07 |
| 2011/0090782 A1 | 4/2011 | Bianchi et al. |
| 2011/0110409 A1 | 5/2011 | Sands et al. |
| 2011/0261842 A1* | 10/2011 | Beili et al. .................... 370/503 |

OTHER PUBLICATIONS

ITU-T G. 993.5, "Self-FEXT cancellation (vectoring) for use with VDSL2 transceivers," Series G: Transmission Systems and Media, Digital Systems and Networks, International Telecommunication Union, Apr. 2010.

ITU-T G.992.3, "Asymmetric digital subscriber line transceivers 2 (ADSL2)," Annex N, "64/65-octet PTM-TC sublayer functional specifications," Series G: Transmission Systems and Media, Digital Systems and Networks, International Telecommunication Union, Apr. 2009.

ITU-T G. 998.2, "Ethernet-based multi-pair bonding," Series G: Transmission Systems and Media, Digital Systems and Networks, International Telecommunication Union, Jan. 2005.

Excerpts from ITU-T G.993.2, "Very high speed digital subscriber line transceivers 2 (VDSL2)," Series G: Transmission Systems and Media, Digital Systems and Networks, International Telecommunication Union (2007), 14 pages.

* cited by examiner

METHOD AND APPARATUS FOR DSL BACK-CHANNEL COMMUNICATION

CROSS-REFERENCE TO RELATED APPLICATIONS

The present application claims priority to U.S. Provisional Application No. 61/495,985 filed Jun. 11, 2011, the contents of which are incorporated by reference herein in their entirety.

FIELD OF THE INVENTION

Apparatuses, systems, methods, techniques, etc. are disclosed for backchannel communication in a vectored DSL system when operating with Layer 2 bonding and, in some embodiments, providing potential simplifications in the routing of backchannel information to the VCE when Layer 2 encapsulation of backchannel information is preferred as compared to earlier apparatus, systems, methods, etc.

BACKGROUND OF THE INVENTION

Dynamic spectrum management level-3 (DSM3) or "vectoring" is a technique in DSL communication systems for mitigating the crosstalk inherent in twisted-pair networks by cancelling and/or precoding signals from a multiplicity of collocated transceivers. The G. vector standard (G.993.5) provides a framework for actively cancelling far-end crosstalk (FEXT) among lines in the vectored DSL system. Certain aspects of vectoring that can be considered background art are described in U.S. Patent Publ. No. 2009/0245340, U.S. Patent Publ. 2008/0049855, U.S. Patent Publ. No. 2010/0195478, U.S. Patent Publ. No. 2009/0271550, U.S. Patent Publ. No. 2009/0310502, U.S. Patent Publ. No. 2010/0046684 and U.S. Pat. No. 7,843,949.

In vectored VDSL2, backchannel information may be communicated from the VTU-R (i.e., the customer-end or remote device) to the VTU-O (i.e., the central office device) during Showtime either via embedded operations channel (EOC) encapsulation or via Layer 2 encapsulation. The VTU-R supports both encapsulation methods and the VCE selects its preferred communication method during initialization. In either case, a VTU-R transports the backchannel information to the VTU-O across its corresponding wire-pair at which point the backchannel information is routed to the VCE by implementation specific means within the access node.

SUMMARY OF THE INVENTION

In general, the present invention relates to apparatuses, systems, methods, techniques, etc. for backchannel communication in a vectored DSL system. According to certain aspects, where the VTU-R supports both EOC and Layer 2 encapsulation of backchannel information (e.g., as currently defined in G.993.5), then a selection of EOC or Layer 2 encapsulation is made. If bonding is enabled, the DSL system (e.g., the VCE or other component) can select EOC or Layer 2 encapsulation. When EOC encapsulation is selected, backchannel information is handled, routed, etc. in the same manner as when bonding is not implemented. If Layer 2 encapsulation is selected, then the DSL system (e.g., the DSL line's VCE) can choose one or more of the following: (1) pre-bonding multiplexing of backchannel information packets with Ethernet (user data) packets prior to bonding processing (this type of implementation can be considered a default configuration because a single bearer channel is configured in all VDSL modems and this type of implementation will be known to work); (2) preemption-based multiplexing of post-bonding-fragmentation (user data) packets and backchannel information packets (provided both VTU-O and VTU-R indicate support for preemption during initialization); and/or (3) dual bearer multiplexing (provided both VTU-O and VTU-R indicate support for multiple bearer channels during initialization). Embodiments of backchannel data communication thus utilize non-EOC encapsulation coupled with multiplexing, interleaving, merging, etc. of backchannel data (e.g., in packets) with user data (e.g., also in packets) being sent as part of implemented bonding.

In accordance with these and other aspects, a method for transporting DSL backchannel data from downstream-end DSL apparatus to upstream-end DSL apparatus in a vectored, bonded-line DSL system according to example embodiments of the invention includes generating backchannel data; encapsulating the backchannel data using Layer 2 encapsulation; packetizing upstream user data into Ethernet packets; combining the backchannel data and the upstream user data; transmitting the combined data to upstream-end DSL apparatus; separating the combined data in the upstream-end DSL apparatus; decapsulating the Layer 2 encapsulated backchannel data; and routing the encapsulated backchannel data to a vectoring control entity.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general, apparatuses, systems, methods, techniques, etc. according to the invention include and pertain to (but are not limited to) improving backchannel communication in a communication system, for example a DSL system or the like. Several embodiments of backchannel communication combine two types of data-packetized user data and Layer 2 encapsulated backchannel data—with each other and transmit the combined data upstream to an access node or the like for separation of the two types of data. The user data is processed in accordance with processing required for whatever type of communication system (e.g., a VDSL or other DSL system) is in operation, while the backchannel data is directed to a vectoring control entity that uses the backchannel data to assist in FEXT mitigation or removal and/or in other ways to improve and/or implement operation of the communication system. Other methods, components, systems, structures, uses, etc. will be apparent to those skilled in the art after considering the following disclosure and the Figures provided herewith. Embodiments of backchannel communication will be discussed in connection with illustrative DSL systems, and with regard to vectored, bonded-line DSL systems in particular in some cases, but the present invention is not solely limited to such implementations and embodiments.

According to G.vector (ITU G.993.5 (April 2010)), the "backchannel" is the channel via which a VTU-R sends clipped error samples to its associated upstream-end VCE. The backchannel can be implemented as part of the embedded operations channel (EOC) or as part of the Ethernet data stream from the VTU-R to the VTU-O. Crosstalk data (e.g., error samples) in vectored DSL systems must be sent by a downstream-end device to the VCE at the upstream-end of the DSL line. This can be accomplished using various means, methods and techniques. For example, in G.vector, the VTU-R sends clipped error samples to the VTU-O through the backchannel established between the VTU-O and the VTU-R in each line of the vectored group. The VTU-O conveys the received clipped error samples to the VCE of the vectored group. Within a downstream-end network termination (NT), clipped error samples can be first sent from the VTU-R to the L2+ functional block, where they are encapsulated into the layer 2 transport protocol and in an upstream data stream (Ethernet encapsulation based on IEEE 802.3). The L2+ blocks in vectored DSL systems according to G.vector represent the Ethernet Layer 2 and above functionalities contained in an access node (AN) and NT and are responsible for encapsulation (at an NT) and decapsulation (at its associated AN) of backchannel data.

Thus in G.993.5 (and potentially other DSL systems) backchannel information is communicated from a VTU-R to its associated VTU-O either through embedded operations channel (EOC) encapsulation or through Layer 2 encapsulation. G.vector VTU-Rs support both encapsulation methods and the vectoring control entity (VCE) selects the backchannel communication method during initialization. In either case, the VTU-R transports the backchannel information to the VTU-O across its corresponding wire-pair, at which point the backchannel information is routed to the VCE within the access node (AN).

When Ethernet bonding (e.g., pursuant to the G.998.2 standard) is configured for use on vectored VDSL2 links, the routing configuration of backchannel information with EOC encapsulation remains the same as that for the case without bonding. However, the present inventors recognize that if Layer 2 encapsulation is instead selected, configuration implications then arise in the routing of backchannel information. The preferred configuration for communication of backchannel information may be dependent on the system implementation in the access node. According to certain aspects of the invention, with methods, systems, configurations, techniques, etc. according to embodiments of backchannel communication herein, a central office based DSL system (e.g., the VCE of such a system) can select the most suitable embodiment. Embodiments herein distinguish essentially between (1) processing backchannel data within and as part of the bonding function and (2) processing backchannel data outside the bonding function. In backchannel communication embodiments, Layer 2 encapsulated data is transmitted without using the EOC.

Figure 1:
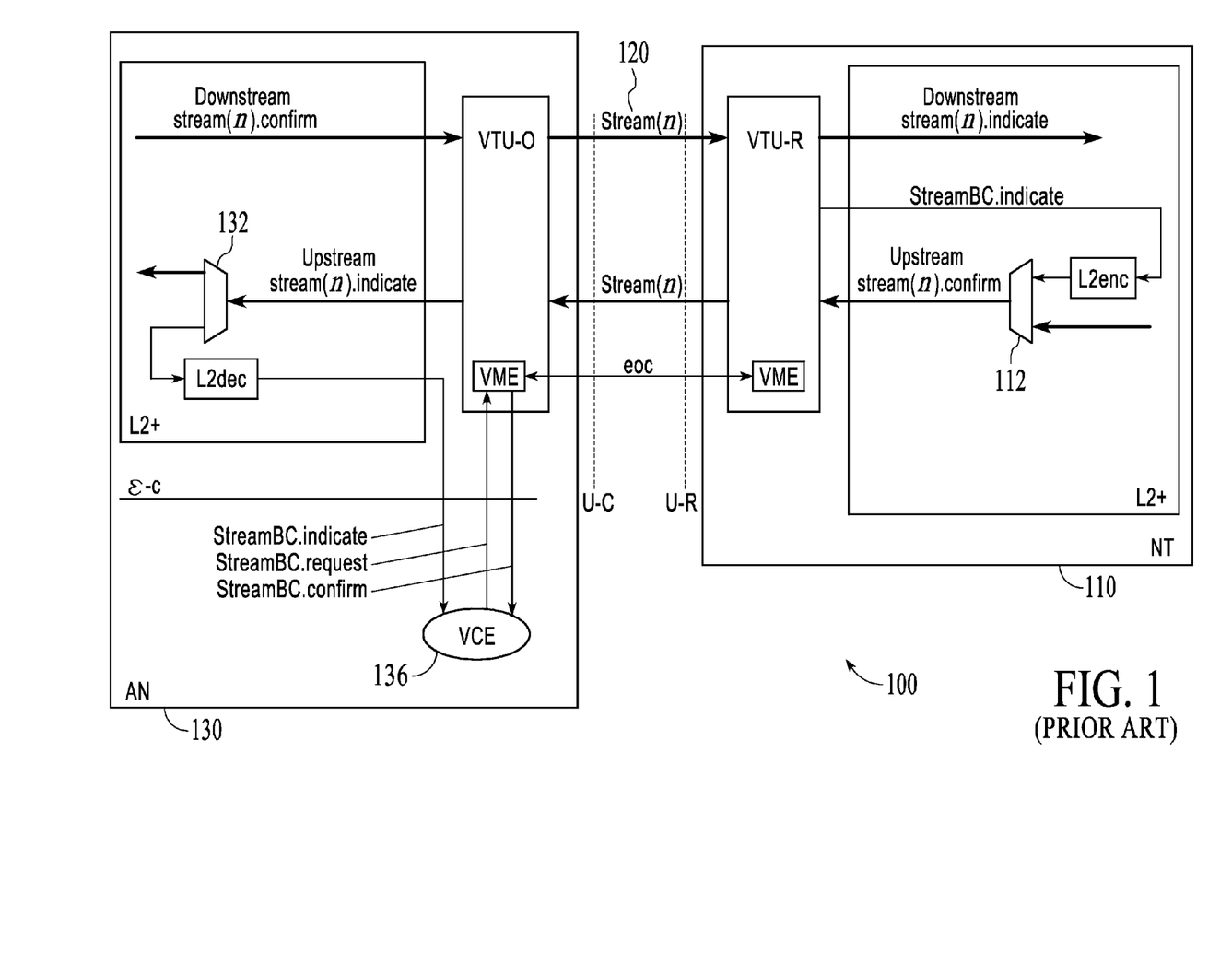
FIGS. 1 and 2 illustrate conventional DSL systems and backchannel communication schemes.

FIG. 1 is from the G.vector (G.993.5) standard and describes the reference model or system 100 for the flow of Layer 2 encapsulated backchannel information between a downstream-end device, VDSL transceiver remote unit (VTU-R) and/or network termination (NT) 110 and an upstream-end device, VDSL transceiver optical network unit (VTU-O) and/or access node 130 via twisted pair link 120. The packet transfer mode-transmission convergence unit (PTM-TC) in VTU-R 110 receives multiplexed stream of Ethernet packets at 112. These packets contain customer data or backchannel data. At the VTU-O, the L2+ entity demultiplexes the received packet stream at 132 and routes the backchannel information to the VCE 136 in the access node (AN) and the customer data to the upper layer.

Figure 2:
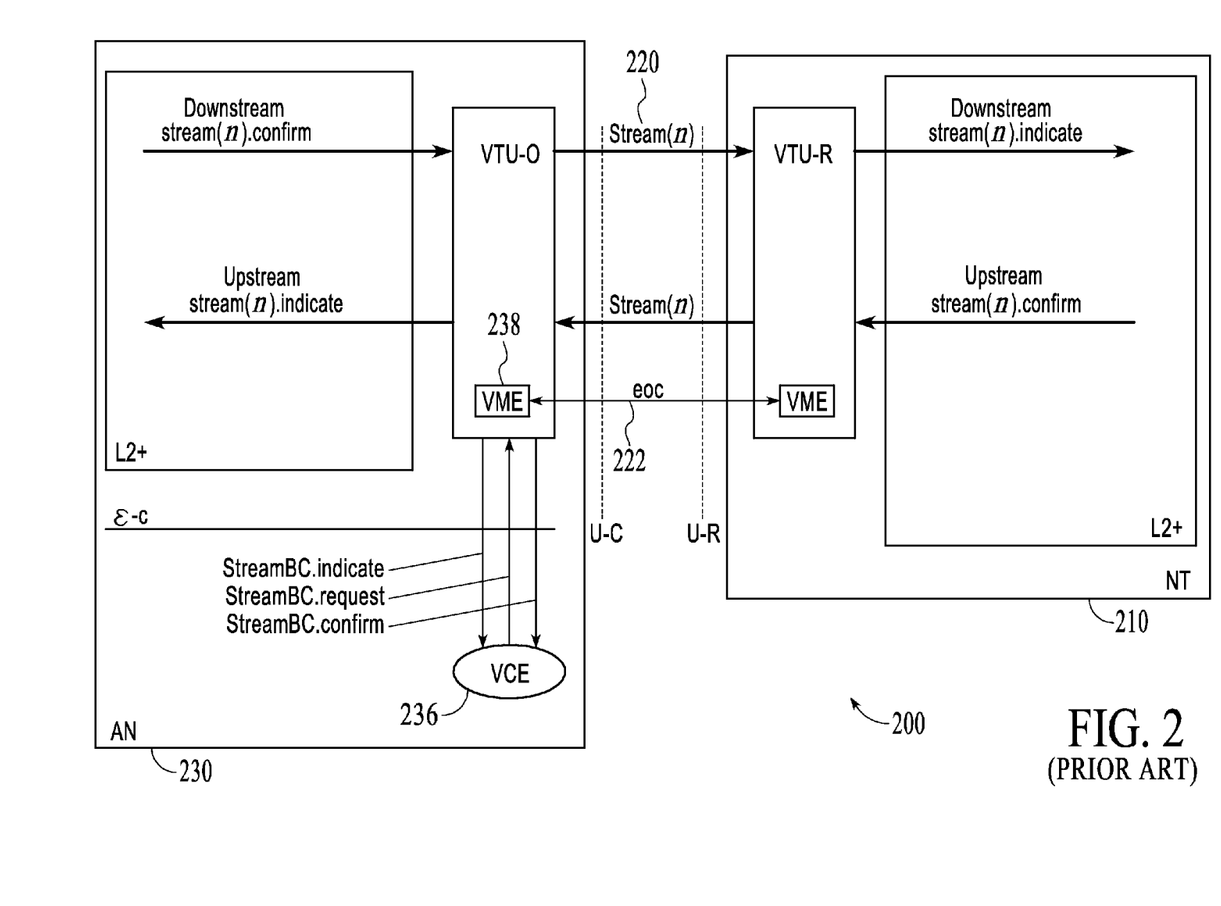

FIG. 2 is also from the G.993.5 standard and describes the reference model or system 200 for the flow of EOC encapsulated backchannel information between NT 210 and AN 230 via twisted pair link 220. Backchannel information in the VTU-R is encapsulated into packet frames and transported to the VTU-O via EOC 222 in the corresponding line 220. At the VTU-O, the VDSL management entity (VME) 238 recovers the backchannel information and then routes it to the VCE 236 within the access node (AN).

Per G.993.5, the VTU-R is required to support both Layer 2 Ethernet encapsulation and EOC encapsulation of backchannel information. During initialization, the VCE selects the encapsulation method to be used and communicates its decision to the VTU-R. When vectored VDSL2 is configured to operate with Ethernet bonding (again, e.g., pursuant to G.998.2) and the VCE selects EOC encapsulation for backchannel information communication, routing of backchannel information from each VTU-O to the VCE in the Access Node is the same as for the case without bonding. With EOC encapsulation, backchannel information is communicated to the VTU-O on the subscriber line connecting to the corresponding VTU-R via its EOC channel, but the Ethernet packets are transmitted in smaller fragments distributed across the lines in the bonded group. In the access node, each VTU-O routes the received fragments to the bonding function, and routes the received backchannel information to the VCE.

The present inventors recognize that if the VCE selects Layer 2 encapsulation of backchannel information when vectored VDSL2 is operating with Ethernet bonding, G.993.5 does not directly specify the configuration for routing of Layer 2 encapsulated backchannel packets relative to the distributed bonding data fragments.

Accordingly, embodiments of the invention provide different valid configurations for the transport of Layer 2 encapsulated backchannel information packets from CPE to the CO when bonding and vectored VDSL2 are implemented together. In a more generalized vectored, bonded-line DSL system, a network termination (NT) includes bonded VTU-Rs (and/or other downstream-end DSL devices) and means for combining first data (e.g., comprising packetized user data) and second data (e.g., comprising Layer 2 encapsulated backchannel data) to generate upstream modem data for DSL upstream transmission. Combining first and second data can include one or more of the following: multiplexing the first and second data, merging the first and second data by some other process and/or means, assigning preemption-based priority to the first and second data, assigning the first data to a first bearer channel and assigning the second data to a second bearer channel. A coupled access node (AN) has VTU-Os (and/or other upstream-end DSL devices) coupled to the downstream-end VTU-Rs using twisted pairs. The AN also includes means for processing transmitted upstream modem data sent by the VTU-Rs to separate packetized user data from Layer 2 encapsulated backchannel data, as well as means for decapsulating Layer 2 encapsulated backchannel data. A vectoring control entity (VCE) is configured to receive decapsulated backchannel data and use such data, for example, in FEXT mitigation and/or removal in a vectored DSL system.

According to certain aspects, embodiments of the present invention include at least three techniques for transporting Layer 2 encapsulated backchannel information and Ethernet bonding fragments, as will be described in more detail below.

Figure 3:
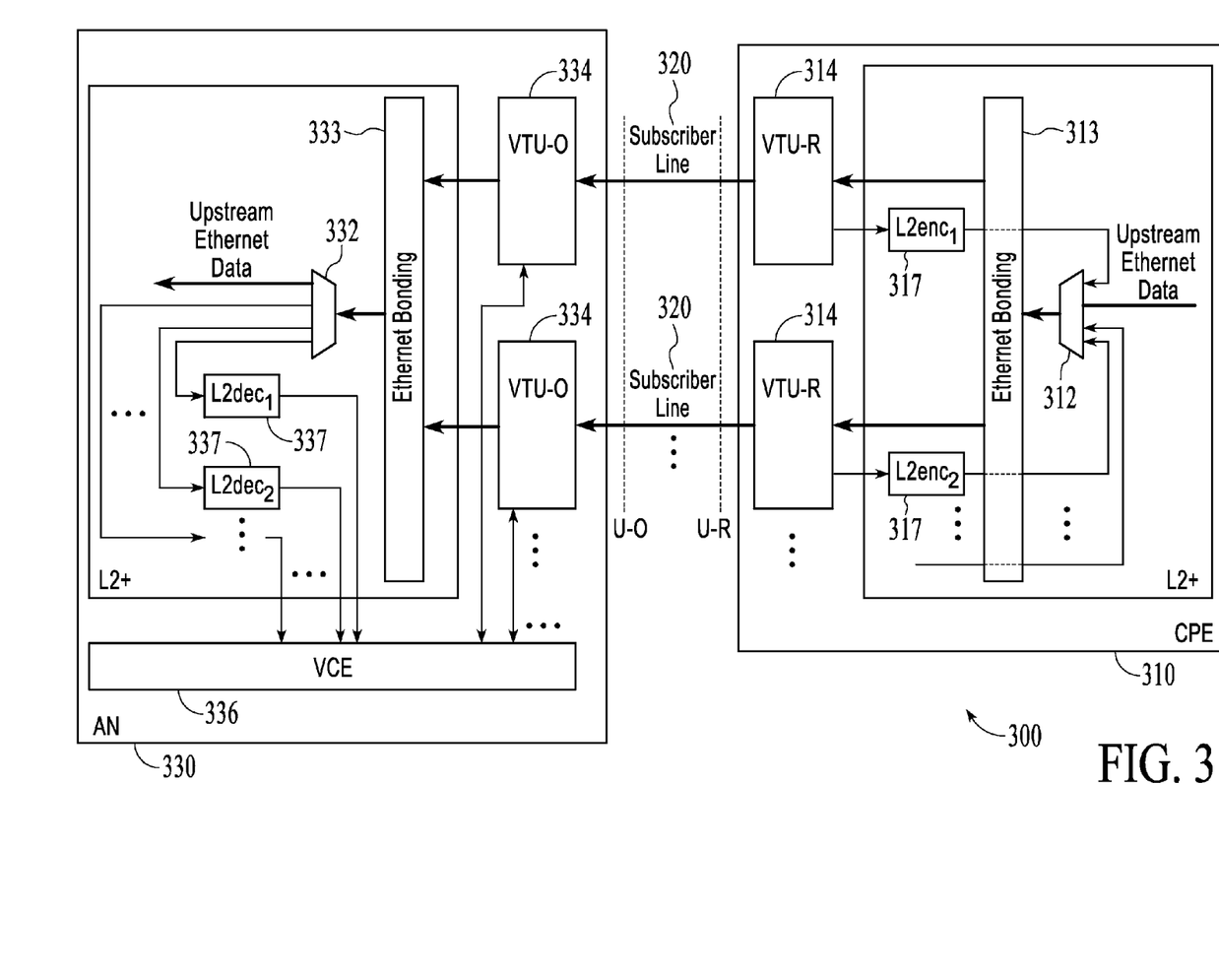
FIGS. 3-5 show various DSL apparatuses, systems and methods implementing backchannel communication configuration embodiments of the present invention.

FIG. 3 shows a DSL system 300 according to one embodiment of the invention that exploits bonding. In this embodiment, bonding is applied to a number of vectored VDSL2 lines 320 (only upstream communication direction is shown in FIG. 3). In this scenario, each of the modems in the group of bonded lines is configured to operate with a single bearer, hence the data carried in bearer channels would be only that of bonding fragments. If the VCE 336 selects Layer 2 encapsulation of backchannel information, the packets of each backchannel in the group of bonded lines from each Layer 2 encapsulation module are multiplexed at 312 with end-user Ethernet packets associated with the bonded group to generate bonding input data. The VTU-R bonding processing module or function 313 fragments all of the packets coming from the multiplexer 312 and distributes the fragments across all the lines 320 in the bonding group. The transmitted bonded DSL data is received at the access node 330 in the central office (CO), where all of the fragments received by the VTU-Os 334 are forwarded to the Ethernet bonding function 333 within access node 330 for reconstruction of the original packets. The recovered packets are de-multiplexed; packets with end-user data are routed to the upper layers in the network and packets with backchannel information are routed to the VCE 336 after decapsulation in Layer 2 decapsulation modules 337. As will be appreciated by those skilled in the art, routing of the backchannel information to the VCE 336 in DSL system 300 takes place only after the receiver bonding function 333 in AN 330. As a result, this type of configuration might be more complex in the routing of backchannel information to VCE 336 where the bonding and VCE functions are implemented in separate locations (e.g., on separate line cards, separate circuit shelves, etc.).

For consistency with non-bonding cases, Layer 2 encapsulated backchannel data can be recovered directly out of a VTU-O for immediate routing to the VCE, thus bypassing routing through the bonding function. This can be achieved by multiplexing the Layer 2 encapsulated backchannel information packets with distributed bonding fragments (i.e., after bonding fragmentation in the CPE bonding function) on each VDSL link in the bonded group of lines. On each link in such configurations, the VTU-O recovers Layer 2 backchannel information specific to that line (and forwards the data to the VCE) prior to forwarding the recovered bonding fragments to the bonding function in the access node. Two example embodiments consistent with definitions in the G.993.2 standard are discussed below.

In a first example, the present inventors recognize that preemption (e.g., according to Annex N of G.992.3 (ITU April 2009)) allows for the transport of a high and low priority packet flow through a single bearer channel. Under control of the PTM entity, the transmission of a low priority packet is paused, then high priority data is transmitted and the transmission of the low priority packet is resumed. Using preemption, the packet insertion delay is minimized for the high priority packets, at the expense of a higher delay for the low priority packets.

Figure 4:
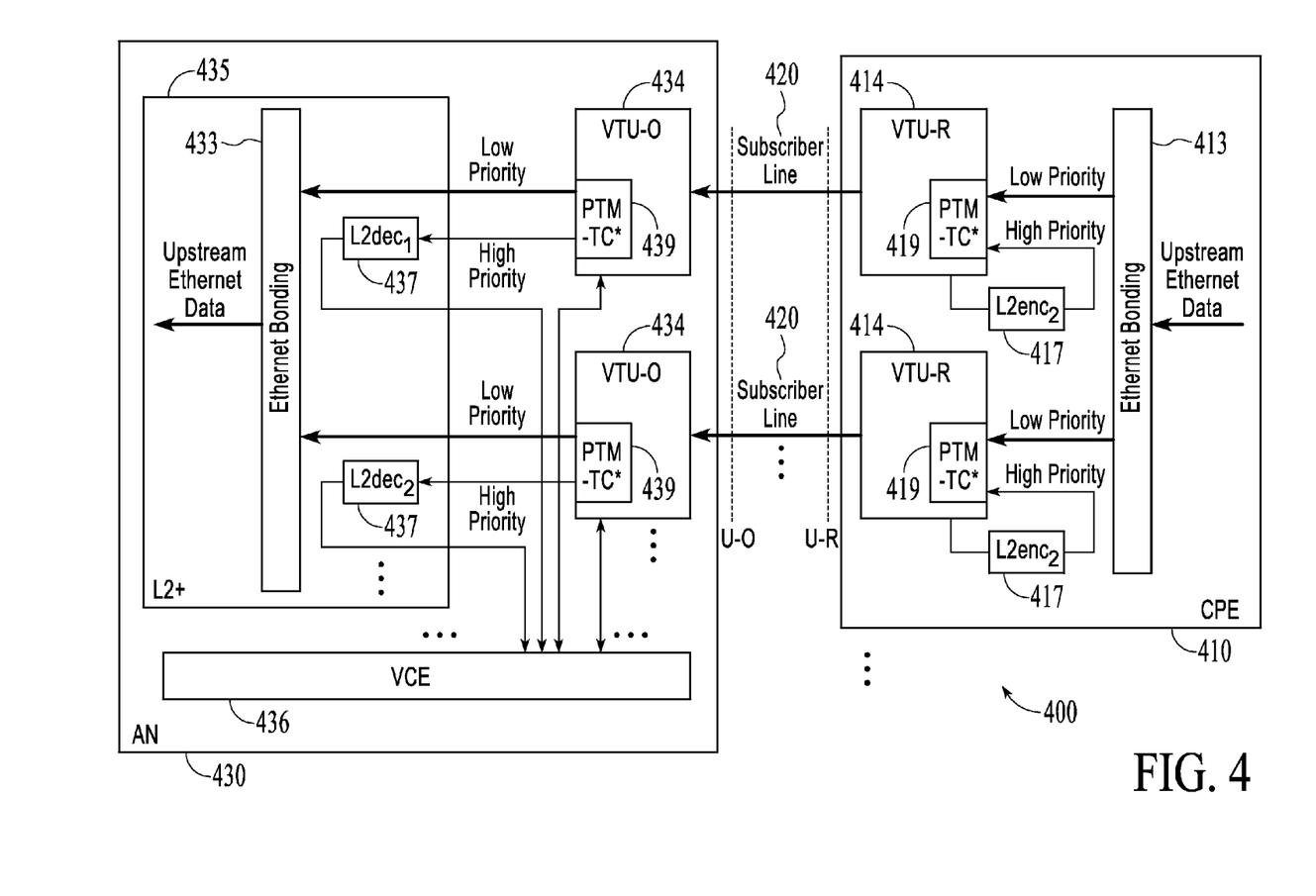

FIG. 4 shows an example DSL system 400 according to one or more embodiments of the invention that exploits preemption as recognized above. In these embodiments, Layer 2 backchannel packets are multiplexed on a single bearer together with end-user data distributed bonding fragments using the packet preemption mechanism provided for in Annex N of G.992.3 and preemption capable VTU-Rs. In such embodiments, the backchannel data are assigned "high priority" and the bonding fragments are assigned "low-priority" with regard to preemption implemented by PTM-TCs 419 (see annex N of G.992.3). The two priorities for each line 420 are identified by appropriately coding the sync byte in the 64/65-octet codeword. At each preemption-capable VTU-O 434, the decoding PTM-TC 439 of the upstream channel separates high priority traffic from low priority traffic and appropriately feeds the separated data to the L2+ entity 435 for further routing and processing. In this type of embodiment, packets containing backchannel data and/or information and encapsulated using Layer 2 (referred to herein as "Layer 2 encapsulated backchannel packets," "Layer 2 packets" and/or the like) can be captured in full prior to the bonding function. This portion of the L2+ entity 435 can route Layer 2 encapsulated backchannel packets to the VCE 436 and route the recovered bonding data fragments (i.e., user data) to the bonding function block 433. As will be appreciated by those skilled in the art, support of packet preemption is an optional capability in VDSL2 and use of this function can only be selected if both the VTU-O and VTU-R support this capability.

Figure 5:
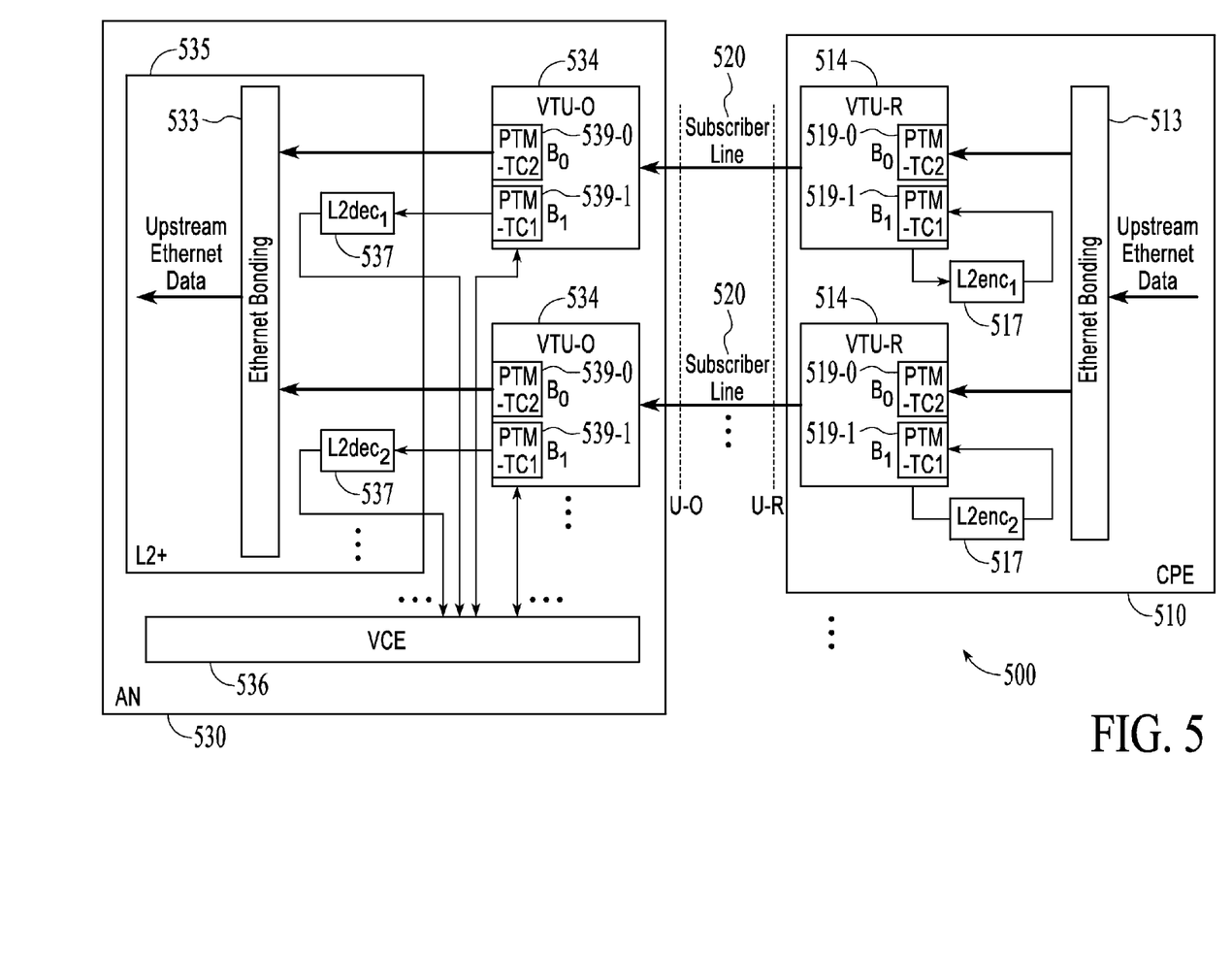

FIG. 5 illustrates an example DSL system 500 according to further embodiments of the invention that exploit multiple-bearer-channel-capable systems. These embodiments transport the backchannel information in a first bearer channel and the distributed bonding fragments in a second, separate bearer, implemented in NT 510 by multiple-bearer-channel-capable VTU-Rs 514 40 having PTM-TC 519-0 (first bearer channel) and PTM-TC 519-1 (second bearer channel) and AN 530 with multiple-bearer-channel-capable VTU-Os 534 with PTM-TCs 539-0, 539-1. Data on one bearer (i.e., with the Layer 2 packets) goes directly to VCE 536; distributed bonding fragments from a second bearer are sent to bonding function 533. As appreciated by those skilled in the art, supporting two bearer channels is optional and separate transport of Layer 2 packets and bonded data fragments can only be implemented if both sides indicate support during initialization. The two bearers may be configured for transport in either one or two latency paths. Suitable Layer 2 encapsulation modules 517 and decapsulation modules 537 are used, as seen in exemplary system 500 of FIG. 5.

As described above, therefore, for the case where Ethernet bonding is applied with Vectored VDSL2, the present invention provides at least three different Layer-2 backchannel transport configurations: (1) Multiplexing of backchannel packets with Ethernet packet prior to bonding (described in connection with FIG. 3)—this is a default configuration in some embodiments; (2) Preemption multiplexing of high priority backchannel packets with low priority bonding fragments into a single bearer (described in connection with FIG. 4); and (3) Mapping of backchannel packets in one bearer and bonding fragments in a second bearer (described in connection with FIG. 5).

As will be appreciated by those skilled in the art, the various embodiments described above offer different options in the handling and routing of recovered backchannel information and bonding data fragments. One type of approach recovers backchannel data at the bonding function output after which the recovered data is routed to the VCE; other approaches capture the backchannel data directly out of the VTU-O (i.e., prior to reaching the bonding function) for immediate routing to the VCE. The descriptions of embodiments in the claims that follow, including any descriptions and/or language that broadens the scope of the present invention, are hereby incorporated by reference into this written description as if fully stated herein.

Figure 6:
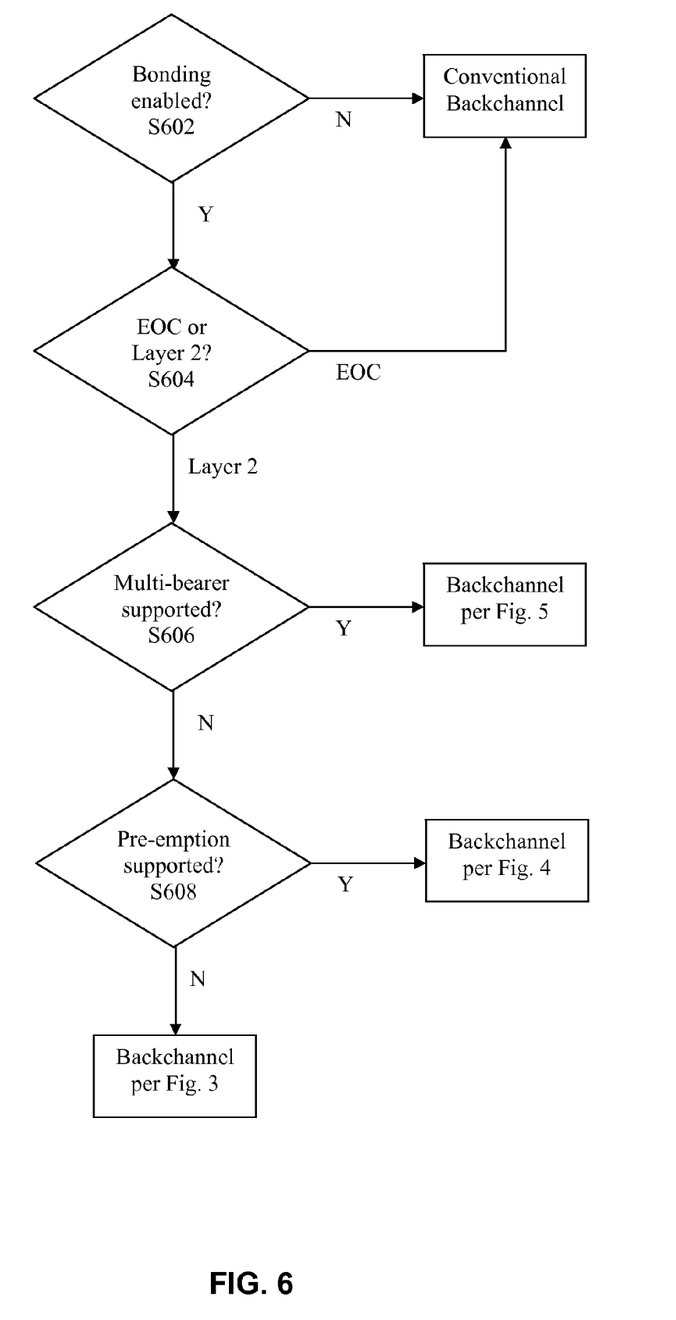
FIG. 6 is a flowchart illustrating an example methodology for configuring backchannel communications according to embodiments of the invention.

An example methodology for configuring a backchannel according to embodiments of the invention will now be described in connection with FIG. 6. This methodology can be included in processing performed during conventional G.vector initialization, for example, and those skilled in the art will appreciate various ways to implement the invention after being taught by the present disclosures.

This example methodology according to the invention will be described in connection with a typical situation where the VTU-R supports both EOC and Layer 2 encapsulation of backchannel information (e.g., as currently defined in G.993.5). In this typical example, a selection of EOC or Layer 2 encapsulation is made during initialization. The VCE selects the encapsulation method to be used and communicates its decision to the VTU-R. The present invention builds upon this conventional scheme as described in more detail below.

In a first step S602, it is determined if bonding is enabled. If not, the backchannel techniques of the invention are not used, and conventional backchannel techniques are used. If bonding is enabled, the DSL system (e.g., the VCE or other component) proceeds to select EOC or Layer 2 encapsulation in step S604. When EOC encapsulation is selected, backchannel information is handled, routed, etc. in the same manner as when bonding is not implemented.

If step S604 determines that Layer 2 encapsulation is selected, then processing continues to step S606. In a next step S606, it is determined whether both the VTU-O and VTU-R supports multiple bearer channels. If so, the DSL line is configured for dual bearer multiplexing as described above in connection with FIG. 5. Otherwise, processing proceeds to step S608 where it is determined whether both VTU-O and VTU-R indicate support for preemption. If so, the DSL line is configured for preemption-based multiplexing of post-bonding-fragmentation (user data) packets and backchannel information packets as described in connection with FIG. 4 above. Otherwise, in a default configuration according to embodiments of the invention, processing proceeds to step S610, where the DSL system (e.g., the DSL line's VCE) configures the system for pre-bonding multiplexing of backchannel information packets with Ethernet (user data) packets prior to bonding processing as described above in connection with FIG. 3. This type of implementation can be considered a default configuration because a single bearer channel is configured in all VDSL modems and this type of implementation will be known to work.

Embodiments of backchannel data communication according to the invention thus utilize non-EOC encapsulation coupled with multiplexing, interleaving, merging, etc. of backchannel data (e.g., in packets) with user data (e.g., also in packets) being sent as part of implemented bonding.

Using one or more embodiments of the backchannel configuration apparatuses, systems, methods, techniques, etc. herein, various advantages are realized for both upstream and downstream vectoring. Those skilled in the art will recognize how to adapt existing known and proprietary DSL vectoring systems to implement the backchannel communication techniques of the present invention. For example, after being taught by the present disclosures, those skilled in the art will understand how to implement the techniques of the invention in one or more of the systems described in U.S. Patent Publ. No. 2009/0245340, U.S. Patent Publ. 2008/0049855, U.S. Patent Publ. No. 2010/0195478, U.S. Patent Publ. No. 2009/0271550, U.S. Patent Publ. No. 2009/0310502, U.S. Patent Publ. No. 2010/0046684 and U.S. Pat. No. 7,843,949.

The many features and advantages of the present disclosure's subject matter are apparent from the written description, and thus, the appended claims are intended to cover all such features and advantages. Further, since numerous modifications and changes will readily occur to those skilled in the art, improved G.vector and/or other DSL system backchannel communication is not limited to exact implementations, constructions and/or operations illustrated and described herein. Therefore, the described embodiments should be taken as illustrative and not restrictive, and backchannel communication hereunder should not be limited to the details given herein but should be defined, inter alia, by the following claims and their full scope of equivalents, whether foreseeable or unforeseeable now or in the future.

More particularly, although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method for transporting DSL backchannel data from downstream-end DSL apparatus to upstream-end DSL apparatus in a vectored, bonded-line DSL system, the method comprising:
    generating backchannel data;
    encapsulating the backchannel data using Layer 2 encapsulation;
    packetizing upstream user data into Ethernet packets;
    combining the backchannel data and the upstream user data;
    transmitting the combined data to upstream-end DSL apparatus;
    separating the combined data in the upstream-end DSL apparatus;
    decapsulating the Layer 2 encapsulated backchannel data; and
    routing the encapsulated backchannel data to a vectoring control entity,
    wherein the backchannel data includes error samples from the downstream-end DSL apparatus, and wherein the routed backchannel data comprises data for mitigating FEXT crosstalk between the upstream-end DSL apparatus and the downstream-end DSL apparatus.

2. The system of claim 1, wherein the DSL system is a VDSL system.

3. A method for transporting backchannel data in a vectored, bonded-line DSL system comprising a bonded DSL line group comprising a plurality of upstream-end DSL devices coupled to a plurality of downstream-end DSL devices using a plurality of twisted pairs, the method comprising:
encapsulating error sample data collected from the plurality of downstream-end DSL devices using Layer 2 encapsulation;
multiplexing the encapsulated error sample data with upstream packetized user data to generate upstream multiplexed data;
processing the upstream multiplexed data using Ethernet bonding processing to generate upstream modem data;
transmitting the upstream modem data to the plurality of upstream-end DSL devices on the plurality of twisted pairs;
the plurality of upstream-end DSL devices receiving and processing the transmitted upstream modem data using Ethernet bonding processing to generate received multiplexed data;
demultiplexing the received multiplexed data to separate packetized user data from encapsulated error sample data;
decapsulating the encapsulated error sample data; and
providing the decapsulated error sample data to a vectoring control entity (VCE).

4. A method for transporting backchannel data in a vectored, bonded-line DSL system comprising a bonded DSL line group comprising a plurality of preemption-capable, bonded upstream-end DSL devices coupled to a plurality of preemption-capable, bonded downstream-end DSL devices using a plurality of twisted pairs, the method comprising:
encapsulating error sample data to generate high priority upstream data, wherein the error sample data is collected from the plurality of bonded downstreamend DSL devices and is encapsulated using Layer 2 encapsulation;
processing upstream user data using Ethernet bonding to generate low priority upstream data;
the plurality of downstream-end DSL devices performing preemption processing of the high priority data and the low priority data to generate upstream modem data, wherein preemption processing is performed within each of the downstream-end DSL devices;
transmitting the upstream modem data on the plurality of twisted pairs;
the plurality of upstream-end DSL devices receiving the transmitted upstream modem data;
the upstream-end DSL devices performing preemption processing of the received upstream modem data to separate high priority data from low priority data, wherein preemption processing is performed within each of the upstreamend DSL devices, further wherein separated low priority data is processed using Ethernet bonding processing;
decapsulating the separated high priority data; and
providing the decapsulated high priority data to a vectoring control entity (VCE).

5. The method of claim 4 wherein the DSL system is a vectored VDSL system.

6. The method of claim 4 wherein preemption processing is performed in a packet transfer mode-transmission convergence unit (PTM-TC) in each upstream-end DSL device and in each downstream-end DSL device.

7. A method for transporting backchannel data in a vectored, bonded-line DSL system comprising a bonded DSL group comprising a plurality of multiple-bearerchamiel-capable, upstream-end DSL devices coupled to a plurality of multiple-bearer-channel-capable, downstream-end DSL devices using a plurality of twisted pairs, the method comprising:
encapsulating error sample data to generate first bearer channel upstream data, wherein the error sample data is collected from the plurality of downstreamend DSL devices and is encapsulated using Layer 2 encapsulation;
processing upstream user data using Ethernet bonding to generate second bearer channel upstream data;
each downstream-end DSL device performing bearer channel processing on the first bearer channel upstream data and the second bearer channel upstream data to generate upstream modem data, wherein bearer channel processing is performed within each of the downstream-end DSL devices;
each downstream-end DSL device transmitting the upstream modem data comprising transmitting the first bearer channel upstream data using a first bearer channel and transmitting the second bearer channel upstream data using a second bearer channel;
the plurality of upstream-end DSL devices receiving the transmitted first bearer channel upstream data and further receiving the transmitted second bearer channel upstream data and performing bearer channel processing on the received first bearer channel data and the received second bearer channel data; and
decapsulating the first bearer channel upstream data and providing the decapsulated first bearer channel upstream data to a vectoring control entity (VCE).

8. The method of claim 7 wherein the DSL system is a vectored VDSL system.

9. The method of claim 7 wherein bearer channel processing is performed in one or more packet transfer mode-transmission convergence units (PTMTCs) in each upstream-end DSL device and in each downstream-end DSL device.

10. The method of claim 7 further comprising processing the received transmitted second bearer channel upstream data to recover bonding data fragments, and providing the recovered bonding data fragments to an upstream-end bonding processing module.

11. A vectored, bonded-line DSL system comprising:
a network termination (NT) comprising:
a plurality of bonded VTU-Rs;
a downstream-end bonding processing module configured to receive bonding input data and to generate bonded DSL data and to provide the bonded DSL data to the plurality of VTU-Rs for transmission on a plurality of twisted pairs;
a Layer 2 encapsulation module coupled to each VTU-R;
a multiplexer configured to generate the bonding input data by receiving and multiplexing:
encapsulated backchannel data from each Layer 2 encapsulation module; and
upstream user data; and
an access node (AN) comprising:

a plurality of VTU-Os, wherein each VTU-R in the NT is coupled to one of the plurality of VTU-Os via a twisted pair;

an upstream-end bonding processing module configured to receive transmitted bonded DSL data via the plurality of VTU-Os and to generate bonding output data;

a demultiplexer configured to receive bonding output data and to separate transmitted upstream user data from transmitted Layer 2 encapsulated backchannel data; and a plurality of decapsulation modules configured to decapsulate transmitted Layer 2 encapsulated backchannel data to generate decapsulated backchannel data.

12. The system of claim 11, further comprising a vectoring control entity (VCE) configured to receive the decapsulated backchannel data.

13. The system of claim 11, wherein the NT comprises an L2+ block comprising the downstream-end bonding module, the Layer 2 encapsulation module and the multiplexer; and further wherein the NT comprises customer premises equipment (CPE) comprising the plurality of VTU-Rs and the L2+ block.

* * * * *

UNITED STATES PATENT AND TRADEMARK OFFICE
CERTIFICATE OF CORRECTION

PATENT NO. : 8,917,747 B2  
APPLICATION NO. : 13/493914  
DATED : December 23, 2014  
INVENTOR(S) : Sorbara et al.

Page 1 of 1

It is certified that error appears in the above-identified patent and that said Letters Patent is hereby corrected as shown below:

In the Specification

Column 4, Line 30, delete "VTU-R 110" and insert -- VTU-R --, therefor.

In the Claims

Column 9, Line 42, Claim 4, delete "downstreamend" and insert -- downstream-end --, therefor.

Column 9, Line 60, Claim 4, delete "upstreamend" and insert -- upstream-end --, therefor.

Column 10, Lines 7-8, Claim 7, delete "multiple-bearerchamiel-capable," and insert -- multiple-bearer-channel-capable, --, therefor.

Column 10, Line 15, Claim 7, delete "downstreamend" and insert -- downstream-end --, therefor.

Signed and Sealed this  
Nineteenth Day of May, 2015

Michelle K. Lee  
*Director of the United States Patent and Trademark Office*